INVENTOR.
MARTIN C. HENDERSON
HERMAN W. HUTCHCRAFT
BY Lindenberg + Freilich
ATTORNEYS INVENTOR.
MARTIN C. HENDERSON
HERMAN W. HUTCHCRAFT
BY Lindenberg + Freilich
ATTORNEYS

United States Patent Office 3,411,030
Patented Nov. 12, 1968

3,411,030
APPARATUS FOR GENERATING CRT DEFLECTION SIGNALS FOR DESCRIBING A CIRCULAR PATTERN

Martin C. Henderson, Canoga Park, and Herman W. Hutchcraft, Camarillo, Calif., assignors to The Bunker-Ramo Corporation, Canoga Park, Calif., a corporation of Delaware Filed Jan. 20, 1967, Ser. No. 610,626
13 Claims. (Cl. 315—22)

ABSTRACT OF THE DISCLOSURE

An apparatus for generating signals to be applied to the horizontal and vertical deflection means of a cathode ray tube for causing the CRT beam to describe a substantially circular pattern. The apparatus employs two integrators and an inverter connected in a closed loop. The integrators each introduce a 90° phase shift and the inverter introduces a 180° phase shift. A closed loop so constructed oscillates providing sine wave signals in phase quadrature suitable for application to the horizontal and vertical deflection means of the CRT for causing the beam to describe a circular pattern.

The invention herein described was made in the course of or under a contract or subcontract thereunder, with the Department of the Air Force, Rome Air Development Center.

BACKGROUND OF THE INVENTION

*Field of the invention*

This invention relates generally to display apparatus as, for example, of the cathode ray tube (CRT) type, and more particularly to means for use therewith for generating deflection signals for causing the CRT beam to describe a circular pattern.

*Description of the prior art*

It is well known that a CRT beam can be deflected to describe a circular pattern by respectively applying sinusoidal signals in phase quadrature to the vertical and horizontal deflection means of the CRT. In prior art systems these signals are normally generated by applying the output of an oscillator directly to one of the deflection means and through a 90° phase shift circuit to the other deflection means. Attenuators are normally provided for the shifted and unshifted signals to enable different size circles to be drawn. Such a system, of course, requires that the attenuators be very accurately matched. Normally, the attenuators include digital to analog conversion means thus enabling the circle size to be digitally controlled.

SUMMARY OF THE INVENTION

In accordance with the present invention, the two sinusoidal deflection signals having a phase difference of 90° are generated in response to the output of a single digital to analog converter by a closed loop circuit employing phase shift stages such as integrators and inverters.

Briefly, the closed loop circuit in accordance with the preferred embodiment of the invention is comprised of a first integrator, an inverter, and a second integrator. The inverter introduces a 180° phase shift and each integrator introduces a 90° phase shift. The outputs of the first and second integrators are respectively applied to the horizontal and vertical deflection means of the display device.

An important feature of the preferred embodiment of the invention involves the provision of a detector which is responsive to the output signal from one of the integrators for controlling beam blanking. Thus, the beam can be unblanked in response to an initial zero crossing of the output signal provided from the first integrator and blanked in response to a subsequent zero crossing of the same signal. Thus, only little more than one cycle is required to describe the circular pattern.

In accordance with a further aspect of the invention, various means are provided for adjusting for imperfections in the described pattern. Thus, for example, means are provided for compensating for vertical and horizontal offset and for eliminating eccentricity of the described circular pattern.

Figure 1:
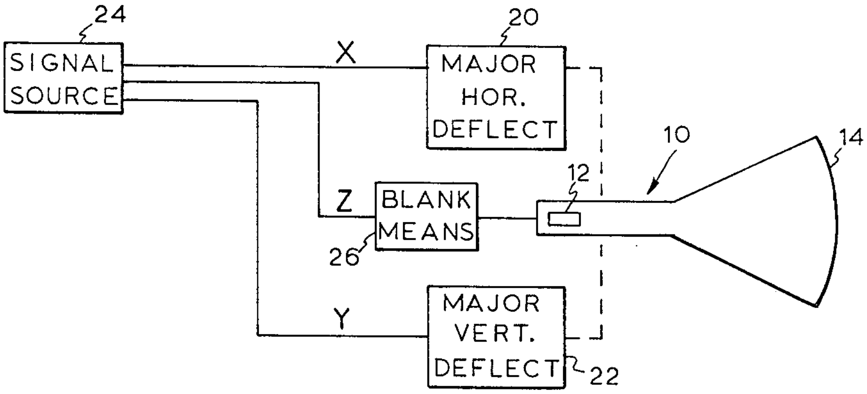
FIGURE 1 is a block diagram of a display system which can incorporate the apparatus of the present invention.

Attention is now called to FIG. 1 which illustrates a block diagram of a display system in which the present invention can be incorporated. Briefly, the system of FIG. 1 includes a display device 10, e.g., a cathode ray tube, having a source 12, such as an electron gun, providing a writing means for describing a pattern on a target 14. The writing means or more particularly an electrom beam is deflected in response to signals applied to a major horizontal deflection means 20 and a major vertical deflection means 22. A signal source 24 provides a horizontal deflection signal X to the deflection means 20 and a vertical deflection signal Y to the deflection means 22. In addition, the signal source 24 provides a blanking signal Z to a blank means 26 controlling the electron gun 12.

In systems of the type shown in FIG. 1 it is desirable to be able to deflect the beam in any manner to form any desired pattern. In systems designed for certain applications it is often necessary to deflect the beam in a circular pattern. As a consequence, in such systems it is desirable to provide a special circuit apparatus for providing deflection signals to the means 20 and 22 for deflecting the beam in a circular pattern. It is well known that a beam can be deflected in a circular pattern by applying sinusoidal signals in phase quadrature to the horizontal and vertical deflection means 20 and 22. As previously pointed out herein, such signals can be provided to the deflection means by coupling the output of an oscillator directly to one of the deflection means and coupling the oscillator output through a 90° phase shift network to the other deflection means. In such a prior art arrangement it is necessary to provide matched digitally responsive attenuators. In accordance with the present invention a circuit apparatus as shown in FIG. 2 is provided which is responsive to the output of a single digital to analog converter means for developing sinusoidal waves in phase quadrature to the horizontal and vertical deflection means.

Figure 2:
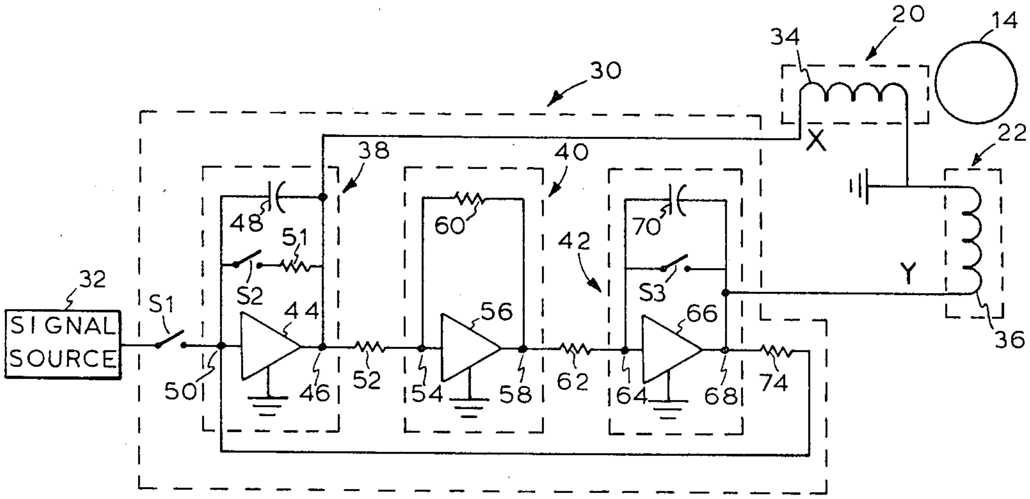
FIG. 2 is a block schematic diagram of an apparatus in accordance with the present invention.

Attention is now called to FIG. 2 which illustrates a circuit apparatus 30 in accordance with the present invention capable of generating deflection signals for application to the deflection means 20 and 22 for causing a circular pattern to be described on the CRT face 14. The circuit apparatus 30 is responsive to analog signals provided by a signal source 32 which may in turn be responsive to the application of digital control signals thereto. Although the deflection means 20 and 22 of FIG. 2 are illustrated as being comprised of magnetic deflection coils 34 and 36, it should be appreciated that other forms of deflection, e.g., electrostatic, could be employed.

In accordance with the present invention, the circuit apparatus 30 is comprised of a first integrator 38, an inverter 40, and a second integrator 42 connected in a closed loop arrangement. More particularly, the output terminal of the first integrator 38 is coupled to the input terminal of the inverter 40 whose output terminal is in turn coupled to the input terminal of the second integrator 42. The output terminal of the second integrator 42 is connected back to the input terminal of the first integrator 38. Briefly, in the operation of the circuit apparatus 30, each integrator provides a phase shift of 90° and the inverter, of course, provides a phase shift of 180° giving a loop phase shift of 360° or one full cycle regardless of frequency. Loop gain is a function of frequency and oscillation occurs at that frequency at which loop gain is unity.

Now considering the circuit apparatus 30 in greater detail, it will be noted that the first integrator 38 is comprised of an operational amplifier 44 whose output terminal 46 is connected through a capacitor 48 to the amplifier input terminal 50. The output terminal of the signal source 32 is connected through a switch S1 to the input terminal 50. A switch S2 is connected in shunt across the operational amplifier 44.

The output terminal 46 of the amplifier 44 is connected through an impedance 52 to the input terminal 54 of an operational amplifier 56. The amplifier 56 is connected as an inverter by connecting its output terminal 58 through a feedback resistor 60 to its input terminal 54.

The output terminal 58 of the operational amplifier 56 is connected through an impedance 62 to the input terminal 64 of an operational amplifier 66 connected as an integrator. That is, the output terminal 68 of amplifier 66 is connected through capacitor 70 to the input terminal 64. A switch S3 is connected in shunt across the amplifier 66. The output terminal 68 of amplifier 66 is connected through resistor 74 to the input terminal 50 of amplifier 44. Although the switches S1, S2, and S3 are illustrated as simple mechanical devices, it should be appreciated that in practice, electronic switches would probably be employed.

The vertical deflection signal Y is derived from the output terminal 68 of amplifier 66 and is applied to the coil 36 of deflection means 22. The horizontal deflection signal X is derived from the output terminal 46 of amplifier 44 and is applied to the coil 34 of deflection means 20.

In order to understand the operation of the circuit of FIG. 2, initially consider the switch S1 to be open and the switches S2 and S3 to be closed. Now assume that switch S1 is momentarily closed to thus provide a current from the signal source 32 to teh amplifier 44. The amplitude of this current will ultimately determine the size of the circle described by the electron beam on the face 14. The analog current pulse provided to the amplifier 44 acts to produce a balancing current through the resistor 51 and switch S2. This condition remains long enough for equilibrium to be substantially reached setting up the initial conditions for the circular pattern to be drawn. The initial horizontal deflection signal value is therefore set by the input signal provided by source 32. The initial vertical deflection signal value is maintained at zero by the switch S3 shunting amplifier 66.

After the initial conditions are established in amplifier 44, switches S1, S2, and S3 are opened. As a consequence, current will flow in the closed loop comprised of the first and second integrators 38 and 42 and the inverter 40. As should be appreciated, the integrators 38 and 42 each introduce a 90° phase shift. The inverter 40 introduces a 180° phase shift thus enabling oscillation to occur in the loop. As previously pointed out, oscillation occurs at that frequency at which the loop gain is unity. In addition, it should be clear to those skilled in the art that the signal output provided by each of the amplifiers 44 and 66 at terminals 46 and 68 will define a sine wave with the potential at terminal 68 leading the potential at terminal 46 by 90°. By subsequently closing switches S2 and S3, the sinusoidal signals in the deflection coils 34 and 36 will, of course, be terminated.

From the foregoing explanation of FIG. 2, it should be apparent that the closed loop circuit apparatus 30 is capable of providing first and second deflection signals in phase quadrature whose amplitudes are established in response to a single analog signal provided by source 32. Although the basic system of FIG. 2 is capable of providing the desired sinusoidal signals, it does not include means for adjusting to compensate for distortions which may be introduced by imperfections in the various components. Accordingly, attention is now called to FIG. 3 which illustrates a preferred embodiment of the invention incorporating a plurality of adjustable controls for enabling the effects of various component imperfections to be made negligible.

In accordance with the preferred embodiment of the invention, the output terminal of source 32 in addition to being connected to one contact of switch S1 is connected to a tap 100 of potentiometer 102.. Additionally, the input terminal 50 of amplifier 44 is connected through a tap 104 to potentiometer 106. The resistor 51 connected in series with switch S2 in FIG. 2 is made variable and designated as 51A in FIG. 3. For purposes to be described hereinafter, the impedance 52 in FIG. 2 is also made variable and is illustrated as 52A in FIG. 3.

Also for reasons to be described hereinafter, a potentiometer 108 is connected between the output terminal 46 of amplifier 44 and the output terminal 58 of amplifier 56. The input terminal 50 of amplifier 44 is connected through resistor 112 to the tap 114 coupled to potentiometer 108. The input terminal 64 of amplifier 66 is connected through tap 116 to potentiometer 118.

The output terminal 58 of amplifier 56 is connected to the input of a zero crossing detector 122 whose output controls an unblank flip-flop 124 which provides the unblank signal Z to the blank means 26 of FIG. 1. The output of flip-flop 124 is connected to a switch control means 126 which controls switches S1, S2, and S3 in a manner to be described.

Figure 3:
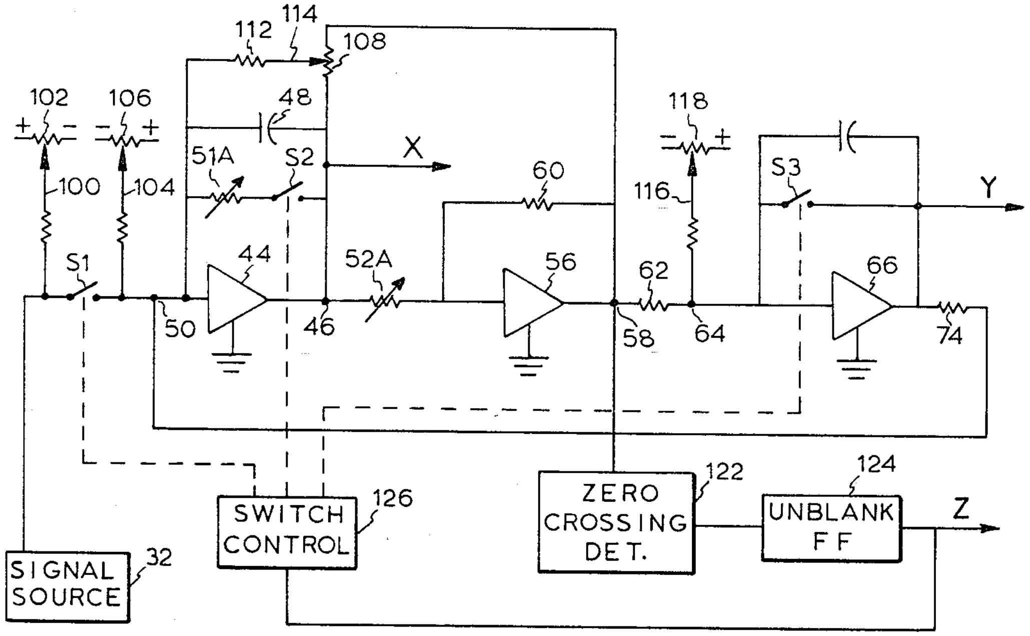
FIG. 3 is a block schematic diagram of the apparatus of FIG. 2 shown in greater detail.
Figure 4:
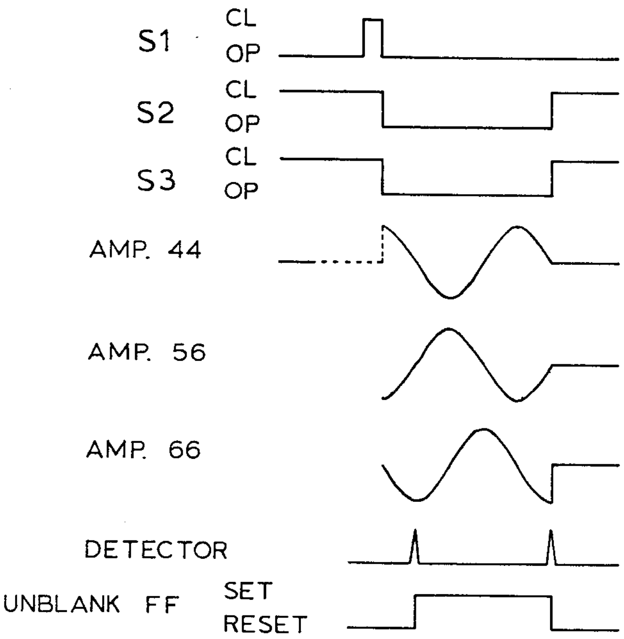
FIG. 4 is a waveform chart illustrating signals occurring at various points in the apparatus of FIG. 3.

In order to better understand the operation of the apparatus of FIG. 3, attention is called to FIG. 4 which illustrates the action of the switches S1, S2, and S3 and depicts the signals provided by the amplifiers 44, 56, and 66 in addition to illustrating the signals provided by the detector 122 and flip-flop 124. Initially consider the switch S1 to be open and the switches S2 and S3 to be closed. Switches S2 and S3 respectively, shunt amplifiers 44 and 46 thereby establishing a zero level output from each. At the initiation of each circle generation operation, switch S1 is closed as shown in FIG. 4 by a signal from the switch control means 126. Switch S1 will be closed for a short fixed interval of time. Switches S2 and S3 will remain closed during this time.

During the time switch S1 is closed, signal source 32 will provide an analog pulse to the amplifier 44 which acts to produce a balancing current through closed switch S2 and variable resistor 51A. This condition remains long enough for equilibrium to be substantially reached. This sets up the initial condition for the deflection signals. The initial value of signal X is established by the amplitude level provided by source 32 and by the adjusted value of resistor 51A. The initial value of signal Y is maintained at zero as a consequence of closed switch S3 shunting amplifier 66. The tap 100 and potentiometer 102 provide a current component to amplifier 44 which establishes the initial condition for the minimum size circle to be described. Thus, even in the absence of current provided by source 32, a circle of a size determined by the setting of tap 100 on potentiometer 102 will be drawn in response to switch S1 closing. Additional current provided by source 32 serves to increase the circle size.

After the initial conditions have been established in amplifier 44, switches S1, S2, and S3 open as is shown in FIG. 4 and as a consequence, oscillation around the closed loop including amplifiers 44, 56, and 66 begins. It can be readily shown mathematically that the configuration of two integrators and an inverter as shown in FIG. 3 will cause the closed loop to oscillate sinusoidally. Suffice it to say herein, however, that it should be clear that a sinusoidal signal applied to integrator 44 and then inverted by inverter 56 and subsequently integrated by integrator 66 will provide at the output of integrator 66 a signal in phase with the sine wave initially applied to amplifier 44. Thus, oscillations are supported in a sinusoidal mode.

Although as shown in FIG. 4, oscillations will begin as soon as switches S2 and S3 open, beam unblanking is not performed immediately because of transient disturbances resulting from imperfections in most readily available switching circuits. Rather, unblanking is performed in response to the horizontal deflection signal X (or its inverse) passing through zero. In order to detect this time, the output terminal 58 of the amplifier 56 is connected to the zero crossing detector 122. As shown in FIG. 4 when the output of amplifier 56 crosses through zero, the detector provides a pulse to set the unblank flip-flop 124. While the flip-flop 124 is set the beam is unblanked. One full cycle later in response to the output of amplifier 56 again crossing through zero in the same direction, the detector 122 will provide a second pulse to reset the unblank flip-flop 124. In response to the unblank flip-flop 124 being reset, the switch control means 126 will close the switches S2 and S3 to terminate oscillations in the closed loop and return the output terminals of amplifiers 44 and 66 to zero potential.

Certain imperfections in the various components, incidental internal delays within the amplifiers, finite gain in the integrating amplifiers 44 and 66, DC offsets within the amplifiers, and various other factors produce effects which should be compensated for. Thus, utilization of the tap 104 and potentiometer 106 compensates for offsets, principally in the switch means S3 and amplifier 66, which affect the DC level of the vertical deflection signal Y either during oscillations or between circle generation operations. Tap 104 is adjusted on potentiometer 106 so that the average or DC vertical deflection signal level during the circle generation is the same as the level when no circle is being generated. The adjustment of tap 104 on potentiometer 106 adjusts the DC output level of amplifier 66 inasmuch as since equilibrium must be maintained, any change in the input to amplifier 44 from tap 104 must be balanced by a change in the input from amplifier 66 by way of resistor 74. Capacitor 48 in the feedback path around amplifier 44 is, of course, an AC path only and will not influence DC balance. Feedback through potentiometer 108 and resistor 112 is insignificant.

A horizontal offset, i.e., an offset in the horizontal deflection signal X level, is similarly adjusted by tap 116 and potentiometer 118. That is, any change effected by the tap 116 and the potentiometer 118 at the input terminal of amplifier 66 will be balanced by a change in the output signal provided by amplifier 44.

Variable impedance 52A adjusts for eccentricity of the generated circle. That is, by adjusting variable impedance 52A the relative amplitude between the horizontal and vertical deflection signals is modified. Thus, adjustment of the impedance 52A enables compensation for tolerance variations in the values of capacitance and resistance.

Whereas adjustment of impedance 52A enables the relative amplitude of signals X and Y to be varied, it is also desirable to provide means enabling the relative phase difference between signals X and Y to be varied inasmuch as the total phase shift around the closed loop may be slightly greater or less than 360° because of device imperfections, incidental capacitive coupling, etc.

An error in this total phase shift will cause either an increase or decrease of amplitude with each cycle, thus producing a spiral rather than a circle. In order to enable phase adjustment, the output terminal 58 of amplifier 56 is connected to the output terminal 46 of amplifier 44 through the potentiometer 108. By adjusting the tap 114 on potentiometer 108, the signal fed back to the input terminal 50 of amplifier 44 can either lag or lead the principal signals applied to terminal 50. Thus, the tap 114 can be moved to adjust the feedback signal through resistor 112 in magnitude and phase to generate a circle rather than a spiral.

The variable impedance 51A enables compensation for imperfections in the switches and the switch control means as well as for any resistance and capacitance tolerance affecting the initial X signal amplitude and hence circle diameter.

From the foregoing, it should be appreciated that a circuit apparatus has been disclosed herein suitable for inexpensively and efficiently generating deflection signals applicable to vertical and horizontal deflection means of a display device such as a cathode ray tube for causing the writing means thereof to describe a circle. The circuit apparatus for generating the deflection signals in accordance with the invention is characterized by utilization of a closed oscillatory loop including first and second integrators and an inverter. Different points in the loop provide the horizontal and vertical deflection signals. Inasmuch as the loop is responsive to a single analog source, the need of providing accurately matched attenuators in order to describe circles is avoided.

The embodiments of the invention in which an exclusive property or privilege is claimed are defined as follows:

1. For use in combination with a display device having vertical and horizontal deflection means, apparatus for generating signals for application to said vertical and horizontal deflection means, respectively, said apparatus including:
- a first integrating means;
- an inverting means;
- a second integrating means;
- means interconnecting said first and second integrating means and said inverting means in series in a closed loop; and
- means for respectively coupling said first and second integrating means to said vertical and horizontal deflection means.

2. The apparatus of claim 1 including an input signal source; and
- first switch means coupling said input signal source to said first integrating means.

3. The apparatus of claim 2 including second and third switch means respectively connected in shunt paths across said first and second integrating means.

4. The apparatus of claim 3 including detector means for detecting the beginning and end of a cycle of a cyclic signal developed in said closed loop; and
- switch control means responsive to said detector means for controlling said first, second and third switch means.

5. The apparatus of claim 1 including detector means for detecting the beginning and end of a cycle of a cyclic signal developed in said closed loop; and
- means for coupling said detector means to said display device for controlling the blanking thereof.

6. In combination with a display device having vertical and horizontal deflection means, apparatus for generating first and second sine wave signals differing in phase by 90° for application to said vertical and horizontal deflection means, said apparatus comprising:
- a first integrator having an input terminal and an output terminal;
- an inverter having an input terminal and an output terminal;

a second integrator having an input terminal and an output terminal;

means coupling said first integrator output terminal to said inverter input terminal;

means coupling said inverter output terminal to said second integrator input terminal;

means coupling said second integrator output terminal to said first integrator input terminal;

means for applying an analog pulse to said first integrator input terminal; and means for respectively coupling said first and second integrator output terminals to said vertical and horizontal deflection means.

7. The apparatus of claim 6 including means for blanking said display device; and detector means for sensing one cycle of a signal appearing at one of said output terminals and for controlling said means for blanking in response thereto.

8. The apparatus of claim 6 wherein said means for applying said analog signal includes a first switch means; and second and third switch means respectively connected in shunt across said first and second integrators.

9. The apparatus of claim 8 including a control means for controlling said first, second and third switch means; and detector means for sensing one cycle of a signal appearing at one of said output terminals and for controlling said control means in response thereto.

10. The apparatus of claim 6 including means for establishing a selected average direct current output potential at at least said first integrator output terminal.

11. The apparatus of claim 6 including means for varying the relative amplitude of signals appearing at said first and second integrator output terminals.

12. The apparatus of claim 6 including a first impedance connected in series between said first integrator and said inverter, a second impedance connected between said inverter and said second integrator, and a third impedance connected between said second integrator and said first integrator; and means for varying the ratio between said first, second, and third impedances.

13. The apparatus of claim 6 including means for varying the phase difference between signals appearing at said first and second integrator output terminals.

References Cited

UNITED STATES PATENTS 2,632,865 3/1953 Hales .............. 315—24

RODNEY D. BENNETT, *Primary Examiner.*

T. H. TUBBESING, *Assistant Examiner.*